Sept. 26, 1939.　　　　W. ALBERT　　　　2,173,991
SHUTTER RELEASE MECHANISM
Filed May 19, 1937
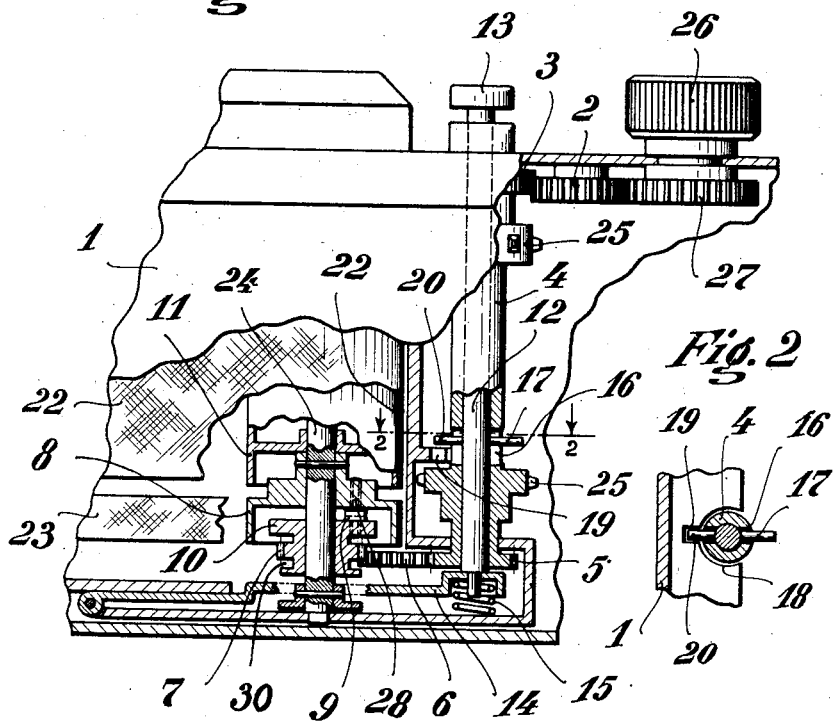
INVENTOR
Wilhelm Albert
BY
ATTORNEY Patented Sept. 26, 1939

2,173,991

UNITED STATES PATENT OFFICE 2,173,991

SHUTTER RELEASE MECHANISM

Wilhelm Albert, Wetzlar, Germany, assignor to Ernst Leitz, G. m. b. H., Wetzlar, Germany Application May 19, 1937, Serial No. 143,415
In Germany June 19, 1936

1 Claim. (Cl. 95—31)

This invention relates to shutter mechanisms for roll film cameras of the type in which the shutter rewinding mechanism and the film advancing mechanism are coupled together so that when the film is advanced for the next picture, the shutter is rewound at the same time. With such coupled shutter and film advancing mechanism it may happen that the shutter release may be accidentally operated before the shutter is completely rewound. Hence the shutter may run back, either open, in which case the newly advanced film would be needlessly exposed. Or the shutter may run back in closed condition, hence it would be necessary to again rewind the shutter and then of course an unused film length would be advanced.

The object of the invention is to provide means for preventing operation of the shutter release before the film has been completely wound up or advanced for the taking of the next picture. The means for preventing such operation are so arranged that the releasing mechanism cannot be operated until after the film conveying roller has made the usual complete revolution for advancing the film for the next picture.

In the accompanying drawing illustrating the invention—

Fig. 1 is a view of a portion of a roll film camera illustrating the invention and with parts removed and parts in section.

Fig. 2 is a sectional detail view on the line 2—2 of Fig. 1.

Fig. 1 illustrates a portion of a well known type of camera in which the shutter consists of two curtains which are operated between curtain rollers to form an exposure. The curtains are attached to curtain rollers and by means of ribbons to ribbon drums. Spring rollers are provided to move the curtains in one direction to open and close the shutter and rewinding means is provided to rewind the shutter springs for the next operation. Inasmuch as such shutters and their detailed construction and operation is well known in the art Fig. 1 shows only so much of the shutter mechanism per se as is necessary for understanding this invention. It is also well known that in such cameras the film is unwound from a supply spool and the exposed film is wound up upon a winding up spool.

Referring to Fig. 1 the one shutter curtain 22 is attached to a curtain roller 11 and the numeral 23 indicates one of the ribbons for attaching the other curtain, not shown, to the ribbon drum 8. The curtains are wound up upon the roller 11 and the drum 8 which are both mounted upon the same curtain shaft 24. When the shutter is released by means hereinafter explained, the shutter springs, not shown, draw the curtains from the right to the left in the drawing to make an exposure and unwind them from the curtain roller and the ribbon drum.

The film, not shown, is wound up upon a film roller, not shown, but located directly beneath the film rewind knob 26. The rewinding being done by means of a film transport roller 4 having sprocket wheels 25 which engage the perforations in the film in the usual manner. At the top the roller 4 carries a gear 3 which is operated from a rewind knob 26 by gears 27 and 2. The rewind knob operates the film roller 16 and the shutter rewinding means through the said gears 27, 2 and 3. At the bottom the film transport roller 4 carries a gear 5 which by means of another gear 6 drives a gear 7 fast upon a coupling member 10. The coupling member is rotatably mounted upon the curtain roller shaft 24 and carries an upstanding pin 9 adapted to engage a depending pin 28 secured to the ribbon drum 8. The shutter release shaft 12 extends down inside the film transport roller 4 and rests upon a member 14 which, upon being depressed by the release shaft, serves to disengage the coupling member 10 from the drum 8 whereupon the shutter springs operate the shutter in a well known manner to make an exposure. The connections between the member 14 and the coupling member 10 are not shown, but may be of any suitable kind, for instance a claw member, not shown, which engages the annular recess 30 in the coupling member 10. The member 14 has a recess which encloses the spring 15 which normally keeps the member 14 in its upper position whereby the coupling member 10 is in normal engagement with the drum 8. The spring 15 also serves to keep the release shaft 12 in normal upper inactive position.

The release shaft 12 is provided with a transverse pin 17 which moves in a slot 16 in the film transport roller 4. One end 20 of the pin is shorter than the other end. When the film has been fully advanced for the taking of the next picture the release shaft may be depressed by a knob 13 to release the shutter as will be understood. The advancement of the film in order to bring an unexposed portion before the exposure opening of the camera takes place simultaneously with the rewinding of the shutter as is well known. The advancing movement of the film the length of one picture is accomplished by operating the rewinding knob 26 whereby the film transport roller 4 makes one complete clockwise revolution. Upon the depression of the release shaft 12 the shorter end 20 of the pin 17 passes down through a slot 19 in a horizontal wall 18 which is part of the camera casing. If the film roller 4 has not made a complete revolution which is necessary for advancing the film, the longer end 17 of the pin will rest above the wall 18 and consequently the release shaft 12 cannot be depressed or operated. When it is desired to take a picture, the release shaft 12 is depressed to move the lever 14 down against the spring 15 and the coupling member 10 is moved down to disengage the pins 9 and 28. The shutter is now released and an exposure is made.

During the operation of the camera the film transport roller shaft 4 makes one complete revolution to advance the film for the taking of the next picture and to wind up the shutter and at the same time the arm 20 of the pin 17 is positioned so as to pass down through the slot 19 when the release knob 13 is operated to release the shutter. If the preceding revolution of the film roller 4 has not been completed the pin 17 will not be able to pass down through the slot 19 and the release cannot be prematurely or accidentally operated.

This invention therefore provides a pin 17 on the shutter release shaft which is automatically placed in a predetermined position to register with the slot 19 at the end of each rewinding movement of the shutter so that a subsequent shutter release may be accomplished. If the pin 17 does not register with the slot 19 it means that the rewinding of the shutter and the advancing of the film have not been completed and the release can therefore not be operated.

I claim:

A roll film camera having a normally closed focal plane shutter, a rotatable depressible slidable shutter release, shutter rewinding means, a film transport roller, means for operating said roller and shutter rewinding means to advance the film and rewind the shutter after an exposure, mechanism preventing operation of said shutter release before said rewinding and film advancing operations have been completed, said mechanism consisting of a projection on said depressible slidable shutter release, a fixed member on the camera in the path of movement of said projection when the shutter release is depressed to prevent such depression, said film transport roller having means for rotating said projection to position it for movement in a path spaced from said fixed member when the aforesaid rewinding and film advancing operations have been completed.

WILHELM ALBERT.